July 29, 1969  J. S. NEWTON  3,458,132
RAIL-TO-TIE FASTENER
Filed Jan. 5, 1968
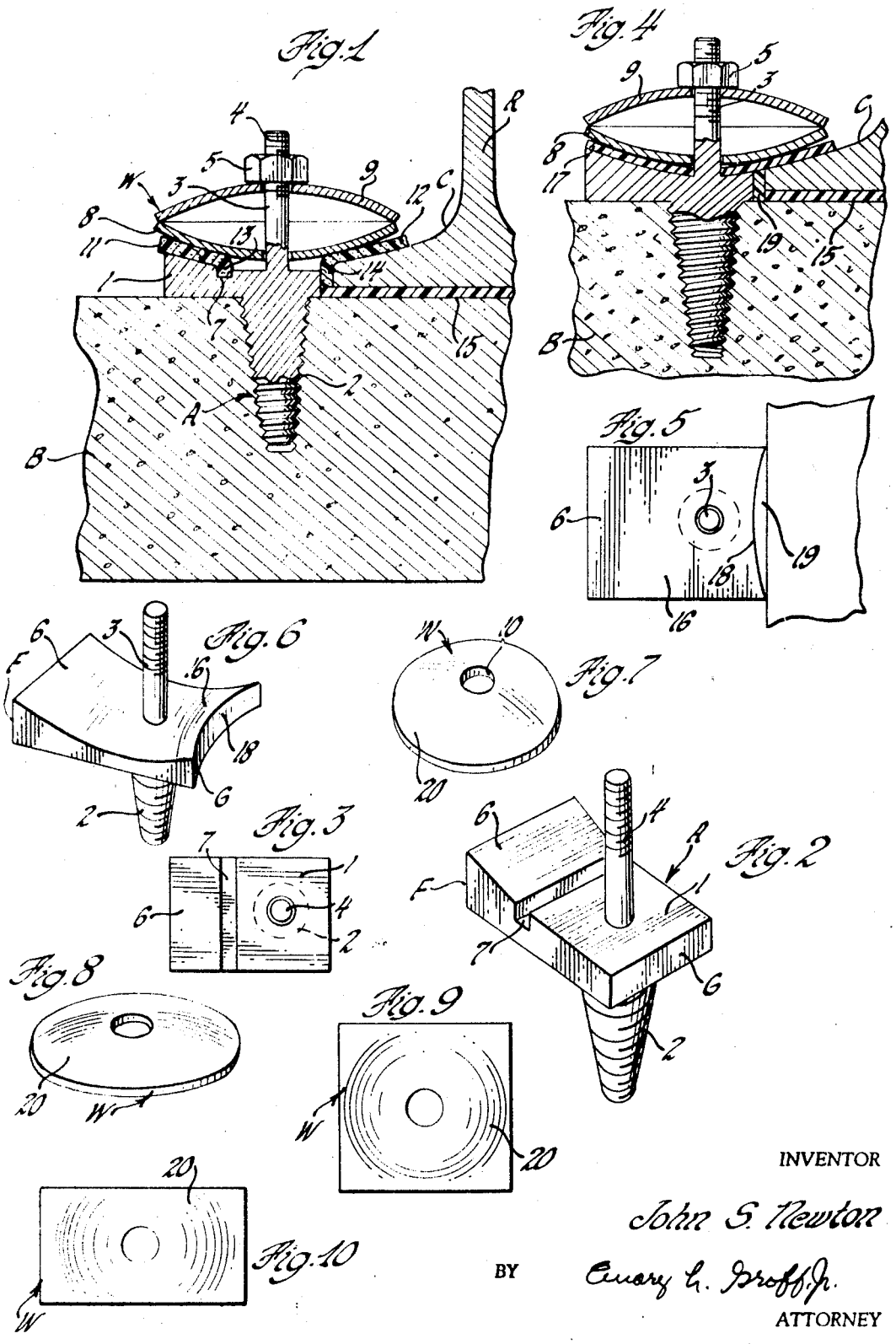
INVENTOR
John S. Newton
BY Emery L. Groff Jr.
ATTORNEY

# United States Patent Office 3,458,132
Patented July 29, 1969

3,458,132
RAIL-TO-TIE FASTENER
John S. Newton, Glen Ellyn, Ill., assignor to Portec, Inc., a corporation of Delaware
Filed Jan. 5, 1968, Ser. No. 695,927
Int. Cl. E01b 9/00, 13/00, 21/04
U.S. Cl. 238—349           7 Claims

ABSTRACT OF THE DISCLOSURE

A spring type rail-to-tie fastener which includes a medially flanged bolt, the portion below the flange being secured in a cross tie and the portion above the flange receiving a pair of reversely disposed concavo-convex spring washers. Retaining means is provided on the outer end of the bolt to exert a downwardly directed force on the spring washers to compress them and urge the spherical surface of the lowermost washer against the sloping base flange of a rail and a similarly sloped surface of the medially disposed bolt flange.

---

This invention relates to a railway rail fastener device which prevents lateral and longitudinal shifting of the rail relative to the cross ties and absorbs vertical movement to minimize pumping of the ties in ballast. Although the invention is primarily intended for use with concrete ties, it may also be used with ties made of wood or plastic.

Accordingly, one of the objects of the invention is to provide a novel arrangement of parts which will exert a substantially constant force on the rail flanges to permit a predetermined uniform maximum deflection of approximately one-quarter of an inch without lifting the tie, and not only hold the rails to gauge, but also deter longitudinal rail movement to complement the function of rail anchors, and restrain undue creeping when fast heavy moving loads are subject to braking forces.

Another object of the invention is to provide a resilient or spring type rail fastener which is placed under compression and provides a relatively large bearing surface or contact area at the point where the fastener engages the surface of the rail flange or insulation placed between the rail flange and the fastener.

Another object of the invention is to provide a novel tie embedded bolt member forming part of the fastener assembly, which member is particularly adapted to receive a spring member having a spherical lower surface, and retain insulating material in stable relationship to the fastener assembly and the rail and cross tie.

A further object of the invention is to provide a construction which lends itself to simple application and removal procedures, thereby effecting savings in the expenditure of time, labor and maintenance factors in installation and service.

A still further object is to provide a construction which is economical to make and easy to assemble for use.

Briefly, the fastener assembly comprises a tie embedded bolt member including a base flange, a shank extending downwardly from the base flange and a stem extending upwardly therefrom. A pair of cupped, oppositely disposed spring washers fit over the stem, and retaining means such as a nut is applied to the free end of the stem to exert a downward force on the uppermost washer to place the pair of washers under compression. It is understood of course that the assembly is used in pairs, that is, one on each side of the rail. The downwardly extending shank may be cast in a concrete or plastic tie, or may be threadedly or otherwise engaged in a socket cast in the tie. When the invention is used in association with wooden ties, the shank of the bolt may be threadedly secured in the tie. The base flange of the bolt is of special design in that, at least its outer or field side slopes upwardly and outwardly from the upwardly projecting stem so as to provide a bearing surface having a degree of slope equal to the degree of slope of the base flange of the rail. The reason for this construction is to provide a balanced seating surface for the spherical contact areas of the lowermost of the pair of cupped, oppositely disposed spring washers which fit over the stem.

Further objects, advantages and novel features of the invention will become readily apparent from the following detailed description with referenec to the accompanying drawings, wherein:

FIGURE 1 is a vertical sectional view of one embodiment of the invention shown mounted on a cross tie and in engagement with a rail.

FIGURE 2 is a perspective view of the bolt member shown in FIGURE 1.

FIGURE 3 is a top plan view of the bolt member shown in FIGURE 2.

FIGURE 4 is a vertical sectional view of another embodiment of the invention shown mounted on a cross tie and in engagement with a rail.

FIGURE 5 is a top plan view of the modified bolt member shown in FIGURE 4.

FIGURE 6 is a perspective view of the bolt member shown in FIGURE 4.

FIGURE 7 is a perspective view of one form of spring washer of circular shape.

FIGURE 8 is a perspective view of one form of spring washer of elliptical shape.

FIGURES 9 and 10 are top plan views of spring washers of square and rectangular shapes, respectively.

Generally, the fastener assembly comprises a bolt member A, a pair of cupped spring washers W and means applied to the bolt and bearing on one of the washers to place both of them under compression.

Referring first to FIGURES 1 and 2 of the drawings, the bolt member A comprises a flange 1 which is generally of rectangular shape in plan view, a lower shank 2 depending from the flange and embedded or otherwise secured in the cross tie B and an upper shank or stem 3 extending upwardly from the flange 1 and axially aligned with the lower shank 2. The upper end 4 of the stem is advantageously threaded to receive a nut 5, although it is within the scope of the invention to omit the threads and utilize for example a stem having a laterally extending head portion adapted to receive a washer and lock nut. The axially aligned shank 2 and stem 3 are eccentric relative to bolt flange 1 such that the portion F of said flange which extends toward the field side is longer than the portion G extending toward the gauge side adjacent the vertical edge of the base flange C of the rail R. It will be noted that the portion F of the bolt flange 1 slopes upwardly as indicated at 6, to substantially the same degree from a horizontal plane although in the opposite direction as the sloping surface of the insulated rail base flange C, and is provided with a groove 7 at the bottom of the slope. The bolt flange 1 is formed in the manner just described so that when the identical cupped spring washers 8, 9 each having a central opening 10 are placed on stem 3 and the washers are compressed by downward movement of nut 5, the lowermost washer 8 will have a uniformly inclined seating surface and will apply maximum hold down or clamping force to the rail base flange C. As shown in FIGURE 1 insulation pieces 11, 12 are disposed between the lowermost washer 8 and the sloping surface 6 of the bolt flange and the upper surface of the rail base flange C. Each of the pieces of insulation 11, 12 are formed with downturned inner end portions 13, 14. End portion 13 fits into groove 7, whereas end portion 14 fits between the gauge side G of bolt flange 1 and the vertical edge of the base flange C of the rail. The pieces of insulation are thus securely contained when the nut 5 is tightened to compress washers 8 and 9. A third piece of insulation 15 fits between the base of the rail and the cross tie B.

In a second embodiment shown in FIGURES 4, 5 and 6, the bolt flange 1 is modified as best shown in FIGURE 6, to the extent that the groove 7 is omitted and the upper surface of the bolt flange 1 slopes continuously upwardly from stem 3 toward the gauge side G as well as toward the field side F. The gauge side G of the bolt flange is sloped to the extent that, when the assembly is installed in track, the upper surface 16 thereof is aligned with the edge of the insulated base flange C of the rail as illustrated in FIGURE 4. In this embodiment, a single piece of insulation 17 provided with a central opening can be slipped over the stem 3 to be supported on the surfaces 6, 16 of the bolt flange and the related surface of rail flange C. Another distinction between the bolt flange of this embodiment and that of FIGURES 1 and 2, is that, in the present embodiment, the gauge side G of the flange is cut away to provide a pocket 18 to retain insulation piece 19 against longitudinal shifting, any vertical shifting of said insulation piece being resisted by insulation 17 and the clamping force exerted thereon by the washer 8. As in the first described embodiment, insulation piece 15 is disposed between the base of the rail and the cross tie.

FIGURES 7-10 illustrate examples of washers of different geometrical shapes. Common to all examples, however, is the concavo-convex shape in cross section which provides a spherical bearing surface 20 where the lowermost washer engages the pieces of insulation 11, 12 in FIGURE 1 or 17 in FIGURE 4. The purpose of the spherical bearing surface is to provide increased contact area between the fastener and the insulation so that the load applied at this point will obviate a condition wherein known types of hold down members of comparatively small surface contact area tend to wear through the insulation, which condition adversely affects the function of the fastener assembly and can defeat the purpose of insulating the hold down member from the rail base.

The particular composition of the insulating material may be rubber or other suitable material which conforms to standards required to meet pressure, weather and temperature conditions likely to be normally encountered in track installations. The insulation pieces 11, 12 and 17 are preferably of uniform thickness, although it is conceivable that a pocket or depression could be provided in the upper surface conforming generally to the contour of the spherical surface of the lowermost washer which may assist in restraining longitudinal shifting of these pieces of insulation.

While I have shown and described certain present preferred embodiments of my invention, it is to be understood that the invention is not limited thereto but may be otherwise variously embodied.

I claim:
1. A rail-to-tie fastener assembly comprising, in combination, a bolt embedded within a tie adjacent the base flange of a rail and including upper and lower shank portions and a laterally extending flange therebetween, said lower shank portion secured in the tie with the gauge edge of said bolt flange adjacent the vertical edge of the base flange of the rail, spring means on the upper portion of said shank and bearing on the field side of said bolt flange and the upper surface of the base flange of the rail, said spring means comprising a pair of oppositely disposed uper and lower concavo-convex spring washers each having a central aperture and spherical outer surface and mounted on the upper portion of said shank, and a substantial area of the spherical surface of said lower washer engaging the upper surface of said bolt flange and the upper surface of the base flange of the rail, whereas said retaining means bears on the spherical surface of said uppermost washer.

2. A rail-to-tie fastener assembly comprising, in combination, a bolt embedded within a tie adjacent the base flange of a rail and including upper and lower shank portions and a laterally extending flange therebetween, said lower shank portion secured in the tie with the gauge edge of said bolt flange adjacent the vertical edge of hte base flange of the rail, spring means on the upper portion of said shank and bearing on the field side of said bolt flange and the upper surface of the base flange of the rail, said spring means comprising upper and lower abutting spring members each having a central opening, at least said lower spring member having a spherical surface juxtaposed said bolt flange and rail base flange, and retaining means secured to the upper shank portion of said bolt above and bearing against said spring means to place said spring means under compression between said retaining means and said bolt flange and base flange of the rail, whereby a substantial area of said compressed lower spring member spherical surface engages said bolt flange and rail base flange.

3. A rail fastener assembly as set forth in claim 2, wherein the upper surface of said bolt flange on the field side of said bolt slopes downwardly from the field side thereof towards said bolt shank portions.

4. A rail fastener assembly as set forth in claim 2, wherein the degree of slope of the upper surface of said bolt flange is substantially equal to the degree of slope of the upper surface of the base flange of the rail to provide converging seating surfaces for the lower member of said spring means.

5. A rail fastener assembly as set forth in claim 2, including insulation material between said spring means and the surface of the bolt flange and the base flange of the rail, and additional insulating material disposed between said rail and tie and between the adjacent edges of said bolt flange and said rail base flange.

6. A rail fastener assembly as set forth in claim 5, wherein said bolt flange is provided with a groove in its upper surface to receive and retain an edge of said insulation material.

7. A rail fastener assembly according to claim 6, wherein the gauge edge of the bolt flange is provided with a pocket to receive and retain insulation material.

References Cited
UNITED STATES PATENTS

| 1,126,531 | 1/1915 | Liebmann | 85—42 |
| 1,186,168 | 6/1916 | Buck | 85—41 |
| 1,320,259 | 10/1919 | Martens | 151—38 |
| 1,358,468 | 11/1920 | Rogers | 238—349 |
| 2,132,571 | 10/1938 | Maney | 85—41 |
| 2,333,518 | 11/1943 | Burkhardt | 238—349 |
| 2,451,414 | 10/1948 | Snyder | 238—349 |

FOREIGN PATENTS

| 221,725 | 5/1959 | Australia. |
| 373,004 | 4/1923 | Germany. |
| 882,341 | 7/1953 | Germany. |
| 17,280 | 9/1894 | Great Britain. |

MARION PARSONS, Jr., Primary Examiner

U.S. Cl. X.R.
85—42; 151—38